(12) United States Patent
Keller (10) Patent No.: US 7,453,461 B2
(45) Date of Patent: *Nov. 18, 2008

(54) IMAGE GENERATION USING LOW-DISCREPANCY SEQUENCES

(75) Inventor: Alexander Keller, Ulm (DE)

(73) Assignee: Mental Images GmbH, Berlin (DE)

( * ) Notice: Subject to any disclaimer, the term of this patent is extended or adjusted under 35 U.S.C. 154(b) by 0 days.

This patent is subject to a terminal disclaimer.

(21) Appl. No.: 11/679,457

(22) Filed: Feb. 27, 2007

(65) Prior Publication Data

US 2007/0229528 A1    Oct. 4, 2007

Related U.S. Application Data

(63) Continuation of application No. 10/299,955, filed on Nov. 19, 2002, now Pat. No. 7,187,379, which is a continuation-in-part of application No. 09/884,861, filed on Jun. 19, 2001, now Pat. No. 7,227,547.

(60) Provisional application No. 60/265,934, filed on Feb. 1, 2001, provisional application No. 60/212,286, filed on Jun. 19, 2000.

(51) Int. Cl.
   *G06T 15/50*    (2006.01)
   *G06F 1/02*    (2006.01)

(52) U.S. Cl. ........................ 345/426; 708/250

(58) Field of Classification Search ........................ None
See application file for complete search history.

(56) References Cited

U.S. PATENT DOCUMENTS 4,897,806  A  *  1/1990  Cook et al. .................. 345/426
5,025,400  A  *  6/1991  Cook et al. .................. 345/611
5,790,442  A  *  8/1998  Ninomiya et al. ............ 708/444
5,809,219  A  *  9/1998  Pearce et al. ................. 345/426
5,940,810  A  *  8/1999  Traub et al. ................ 705/36 R
6,211,882  B1 *  4/2001  Pearce et al. ................. 345/419
6,370,270  B1 *  4/2002  Nair et al. .................... 382/209
6,529,193  B1 *  3/2003  Herken et al. ............... 345/426

OTHER PUBLICATIONS

Tien-Tsin Wong, Wai-Shing Luk, Pheng-Ann Heng, "Sampling with Hammersley and Halton Points", Nov. 1997, Journal of Graphics Tools, vol. 2, No. 2, p. 9-24.*
Andrew Keller, "Instant Radiosity," Aug. 3, 1997, Computer Graphics Proceedings, SIGGRAPH 97, p. 49-56.*
Robert L. Cook, "Stochastic Sampling in Computer Graphics," Jan. 1986, ACM Transactions on Graphics (TOG), vol. 5, Issue 1, p. 51-72.*

* cited by examiner

*Primary Examiner*—Ulka Chauhan
*Assistant Examiner*—Jason M Repko
(74) *Attorney, Agent, or Firm*—Jacobs & Kim LLP; David Jacobs (57) ABSTRACT

A computer graphics system generates a pixel value for a pixel in an image and displays a human-perceptible image on an LCD CRT or other display device based on an electrical output generated in response to the pixel value, the pixel being representative of a point in a scene as recorded on an image plane of a simulated camera, the computer graphics system being configured to generate the pixel value for an image using a selected ray-tracing methodology in which simulated rays are shot from respective ones of a plurality of subpixels in the pixel each subpixel having coordinates in the image plane. The computer graphics system comprises a sample point generator and a function evaluator.

2 Claims, 2 Drawing Sheets

FIG.1

(2002) GENERATE SAMPLE POINTS BY MAPPING SUBPIXEL
COORDINATES ($S_x$, $S_y$) ONTO STRATA COORDINATES $$(j,k) := \left(s_x \bmod 2^n, s_y \bmod 2^n\right),$$

FROM WHICH RAY TO BE SHOT IN ACCORDANCE WITH $$x_i = \left(s_x + \frac{\sigma(k)}{2^n}, s_y + \frac{\sigma(j)}{2^n}\right)$$

WHERE "i" IS INSTANCE NUMBER FOR RAY GENERATED
AS $i = j2^n + \sigma(k)$, WHERE INTEGER PERMUTATION $$\sigma(k) := 2^n \Phi_b(k) \text{ for } 0 \leq k < 2^n$$

FOR SELECTED "N," WHERE $\phi_B(X)$ IS RADICAL INVERSE FUNCTION GIVEN BY $$\Phi_b : N_0 \to I$$

$$x = \sum_{j=0}^{\infty} a_j(x) b^j \mapsto \sum_{j=0}^{\infty} a_j(x) b^{-j-1}$$

WHERE $$\left(a_j\right)_{j=0}^{\infty}$$

IS REPRESENTATION OF "x" IN A SELECTED INTEGER BASE "b"

↓

(2004) GENERATE FUNCTION EVALUATION VALUE REPRESENTING EVALUATION OF
SELECTED FUNCTION, USING STRATA COORDINATES GENERATED BY GENERATING OF
SAMPLE POINTS, FUNCTION EVALUATION VALUE CORRESPONDING TO THE PIXEL VALUE

↓

(2006) GENERATE PIXEL VALUE FOR PIXEL IN IMAGE (PIXEL VALUE REPRESENTATIVE OF
POINT IN SCENE AS RECORDED ON IMAGE PLANE OF SIMULATED CAMERA; PIXEL VALUE
GENERATED USING RAY-TRACING METHODOLOGY IN WHICH SIMULATED
RAYS SHOT FROM SUBPIXELS IN PIXEL, EACH SUBPIXEL HAVING
COORDINATES ($S_x$, $S_y$) IN THE IMAGE PLANE)

↓

(2008) GENERATE ELECTRICAL OUTPUT SIGNAL
RESPONSIVE TO PLURALITY OF PIXEL VALUES

↓

(2010) DISPLAY IMAGE ON DISPLAY DEVICE
RESPONSIVE TO ELECTRICAL OUTPUT SIGNAL

FIG. 2

IMAGE GENERATION USING LOW-DISCREPANCY SEQUENCES

RELATED APPLICATIONS AND INCORPORATION BY REFERENCE

The present application is a Continuation of U.S. patent application Ser. No. 10/299,955 filed Nov. 19, 2002 (issued as U.S. Pat. No. 7,187,379), which is a Continuation-in-Part of U.S. patent application Ser. No. 09/884,861 filed Jun. 19, 2001 (issued as U.S. Pat. No. 7,227,547), which claims priority from Provisional App. 60/265,934 filed Feb. 1, 2001 (expired) and Provisional App. 60/212,286 filed Jun. 19, 2000 (expired), each incorporated by reference herein. Also incorporated by reference herein U.S. patent application Ser. No. 08/880,418, filed Jun 23, 1997 (issued as U.S. Pat. No. 6,529,193), Grabenstein, et al., entitled "System And Method For Generating Pixel Values . . . "("Grabenstein application") assigned to the assignee of this application.

FIELD OF THE INVENTION

The invention relates generally to computer graphics methods, systems and computer programs, and more particularly, to generating and displaying or storing images using electrical outputs based on pixel values calculated by evaluating integrals using quasi-Monte Carlo methodologies. Among other aspects, the invention uses low-discrepancy sequences and trajectory splitting by dependent sampling. As used herein the term "programs" can encompass any computer program product comprising computer-readable program instructions encoded on a computer readable medium.

BACKGROUND OF THE INVENTION

In computer graphics, a computer is used to generate digital data that represents the projection of surfaces of objects in, for example, a three-dimensional image plane, to simulate the recording of the scene by, for example, a camera. The camera may include a lens for projecting the image of the scene onto the image plane, or it may comprise a pinhole camera in which case no lens is used. The two-dimensional image is in the form of an array of picture elements ("pixel" or "pels"), and the digital data generated for each pixel (pixel values) represent the color luminance of the scene as projected onto the image plane at the point of the respective pixel in the image plane. Human-perceptible images can be displayed by a display device (or stored in a storage device) based on electrical outputs generated in response to the pixel values. The surfaces of the objects may have any of a number of characteristics, including shape, color, specularity, texture, and so forth, which are preferably rendered in the image as closely as possible, to provide a realistic-looking image.

Generally, the contributions of the light reflected from the various points in the scene to the pixel value representing the color and intensity of a particular pixel are expressed in the form of the one or more integrals of relatively complicated functions. Since the integrals used in computer graphics generally will not have a closed-form solution, numerical methods must be used to evaluate them and thereby generate the pixel value. Typically, a conventional "Monte Carlo" method has been used in computer graphics to numerically evaluate the integrals. Generally, in the Monte Carlo method, to evaluate an integral $$\langle f \rangle = \int_{[0,1)^s} f(x)dx \quad (1)$$

where f(x) is a real function on the "s"-dimensional unit cube $[0, 1)^s$ (that is, an s-dimensional cube each of whose dimension includes "zero," and excludes "one"), first a number "N" statistically-independent randomly-positioned points $x_i$, i=1, . . . , N, are generated over the integration domain. The random points $x_i$ are used as sample points for which sample values $f(x_i)$ are generated for the function f(x), and an estimate $\bar{f}$ for the integral is generated as $$\langle f \rangle \approx \bar{f} = \frac{1}{N}\sum_{i=1}^{N} f(x_i) \quad (2)$$

As the number of random points used in generating the sample points $f(x_i)$ increases, the value of the estimate $\bar{f}$ will converge toward the actual value of the integral $\langle f \rangle$. Generally, the distribution of estimate values that will be generated for various values of "N," that is, for various numbers of sample points, of being normal distributed around the actual value with a standard deviation a which can be estimated by $$\sigma = \sqrt{\frac{1}{N-1}(\overline{f^2} - \bar{f}^2)} \quad (3)$$

if the points $x_i$ used to generate the sample values $f(x_i)$ are statistically independent, that is, if the points $x_i$ are truly positioned at random in the integration domain.

Generally, it has been believed that random methodologies like the Monte Carlo method are necessary to ensure that undesirable artifacts, such as Moiré patterns and aliasing and the like, which are not in the scene, will not be generated in the generated image. However, several problems arise from use of the Monte Carlo method in computer graphics. First, since the sample points $x_i$ used in the Monte Carlo method are randomly distributed, they may clump in various regions over the domain over which the integral is to be evaluated. Accordingly, depending on the set of points that are generated, in the Monte Carlo method for significant portions of the domain there may be no sample points $x_i$ for which sample values $f(x_i)$ are generated. In that case, the error can become quite large. In the context of generating a pixel value in computer graphics, the pixel value that is actually generated using the Monte Carlo method may not reflect some elements which might otherwise be reflected if the sample points $x_i$ were guaranteed to be more evenly distributed over the domain. This problem can be alleviated somewhat by dividing the domain into a plurality of sub-domains, but it is generally difficult to determine a priori the number of sub-domains into which the domain should be divided, and, in addition, in a multi-dimensional integration region, which would actually be used in computer graphics rendering operations, the partitioning of the integration domain into sub-domains, which are preferably of equal size, can be quite complicated.

In addition, since the method makes use of random numbers, the error $|\bar{f} - \langle f \rangle|$ (where $|x|$ represents the absolute value of the value "x") between the estimate value $\bar{f}$ and actual value $\langle f \rangle$ is probabilistic, and, since the error values for various large values of "N" are close to normal distribution around the actual value $\langle f \rangle$ only sixty-eight percent of the estimate values $\bar{f}$ that might be generated are guaranteed to lie within one standard deviation of the actual value $\langle f \rangle$.

Furthermore, as is clear from equation (3), the standard deviation a decreases with increasing numbers "N" of sample points, proportional to the reciprocal of square root of "N" (that is $1/\sqrt{N}$). Thus, if it is desired to reduce the statistical error by a factor of two, it will be necessary to increase the number of sample points N by a factor of four, which, in turn, increases the computational load that is required to generate the pixel values, for each of the numerous pixels in the image.

Additionally, since the Monte Carlo method requires random numbers to define the coordinates of respective sample points $x_i$ in the integration domain, an efficient mechanism for generating random numbers is needed. Generally, digital computers are provided with so-called "random number" generators, which are computer programs which can be processed to generate a set of numbers that are approximately random. Since the random number generators use deterministic techniques, the numbers that are generated are not truly random. However, the property that subsequent random numbers from a random number generator are statistically independent should be maintained by deterministic implementations of pseudo-random numbers on a computer.

The Grabenstein application describes a computer graphics system and method for generating pixel values for pixels in an image using a strictly deterministic methodology for generating sample points, which avoids the above-described problems with the Monte Carlo method. The strictly deterministic methodology described in the Grabenstein application provides a low-discrepancy sample point sequence which ensures, a priori, that the sample points are generally more evenly distributed throughout the region over which the respective integrals are being evaluated. In one embodiment, the sample points that are used are based on a so-called Halton sequence. See, for example, J. H. Halton, *Numerische Mathematik*, Vol. 2, pp. 84-90 (1960) and W. H. Press, et al., Numerical Recipes in Fortran (2d Edition) page 300 (Cambridge University Press, 1992). In a Halton sequence generated for number base "b," where base "b" is a selected prime number, the "k-th" value of the sequence, represented by $H_b^k$ is generated by use of a "radical inverse" function radical inverse function $\Phi_b$ that is generally defined as $$\Phi_b : N_0 \to I \quad (4)$$

$$i = \sum_{j=0}^{\infty} a_j(i) b^j \mapsto \sum_{j=0}^{\infty} a_j(i) b^{-j-1}$$

where $(\alpha_j)^{28}_{j=0}$ is the representation of "i" in integer base "b." Generally, a radical inverse of a value "k" is generated by (1) writing the value "k" as a numerical representation of the value in the selected base "b," thereby to provide a representation for the value as $D_M D_{M-1} \ldots D_2 \, _l \, _{D1}$, where $D_m$ (m=1, 2, ..., M) are the digits of the representation, (2) putting a radix point (corresponding to a decimal point for numbers written in base ten) at the least significant end of the representation $D_M D_{M-1} \ldots D_2 D_1$ written in step (1) above, and (3) reflecting the digits around the radix point to provide $0.D_1 D2 \ldots D_{M-1} D_M$, which corresponds to $H_b^k$.

It will be appreciated that, regardless of the base "b" selected for the representation, for any series of values, one, two, . . . "k," written in base "b," the least significant digits of the representation will change at a faster rate than the most significant digits. As a result, in the Halton sequence $H_b^1$, $H_b^2, \ldots H_b^k$, the most significant digits will change at the faster rate, so that the early values in the sequence will be generally widely distributed over the interval from zero to one, and later values in the sequence will fill in interstices among the earlier values in the sequence. Unlike the random or pseudo-random numbers used in the Monte Carlo method as described above, the values of the Halton sequence are not statistically independent; on the contrary, the values of the Halton sequence are strictly deterministic, "maximally avoiding" each other over the interval, and so they will not clump, whereas the random or pseudo-random numbers used in the Monte Carlo method may clump.

It will be appreciated that the Halton sequence as described above provides a sequence of values over the interval from zero to one, inclusive along a single dimension. A multidimensional Halton sequence can be generated in a similar manner, but using a different base for each dimension, where the bases are relatively prime.

A generalized Halton sequence, of which the Halton sequence described above is a special case, is generated as follows. For each starting point along the numerical interval from zero to one, inclusive, a different Halton sequence is generated. Defining the pseudo-sum x epy for any x and y over the interval from zero to one, inclusive, for any integer "p" having a value greater than two, the pseudo-sum is formed by adding the digits representing "x" and "y" in reverse order, from the most of the significant digit to the least-significant digit, and for each addition also adding in the carry generated from the sum of next more significant digits. Thus, if "x" in base "b" is represented by $0.X_1 X_2 \ldots X_{M-1} X_M$, where each "$X_m$" is a digit in base "b," and if "y" in base "b" is represented by $0Y_1 Y_2 \ldots Y_{N-1} Y_N$, where each "$Y_n$" is a digit in base "b" (and where "M," the number of digits in the representation of "x" in base "b", and "N," the number of digits in the representation of "y" in base "b", may differ), then the pseudo-sum "z" is represented by $0Z_1 Z_2 L_{L-1} Z_L$, where each "$Z_1$" is a digit in base "b" given by $Z_1 = (X_1 + Y_1 + C_1) \bmod b$, where "mod" represents the modulo function, and $$C_l = \begin{cases} 1 & \text{for } X_{l-1} + Y_{l-1} + Z_{l-1} \geq b \\ 0 & \text{otherwise} \end{cases}$$

is a carry value from the "1-1st" digit position, with $C_1$ being set to zero.

Using the pseudo-sum function as described above, the generalized Halton sequence that is used in the system described in the Grabenstein application is generated as follows. If "b" is an integer, and $x_0$ is an arbitrary value on the interval from zero to one, inclusive, then the "p"-asdic von Neumann-Kakutani transformation $T_b(x)$ is given by $$T_p(x) := x \oplus_p \frac{1}{b}, \quad (5)$$

and the generalized Halton sequence $x_0, x_1, x_2 \ldots$ is defined recursively as $$x_{n+1} = T_b(x_n) \quad (6)$$

From equations (5) and (6), it is clear that, for any value for "b," the generalized Halton sequence can provide that a different sequence will be generated for each starting value of "x," that is, for each $x_0$. It will be appreciated that the Halton sequence $H_b{}^k$ as described above is a special case of the generalized Halton sequence (equations (5) and (6)) for $x_0=0$.

The use of a strictly deterministic low-discrepancy sequence such as the Halton sequence or the generalized Halton sequence can provide a number of advantages over the random or pseudo-random numbers that are used in connection with the Monte Carlo technique. Unlike the random numbers used in connection with the Monte Carlo technique, the low discrepancy sequences ensure that the sample points are more evenly distributed over a respective region or time interval, thereby reducing error in the image which can result from clumping of such sample points which can occur in the Monte Carlo technique. That can facilitate the generation of images of improved quality when using the same number of sample points at the same computational cost as in the Monte Carlo technique.

SUMMARY OF THE INVENTION

The invention provides a new and improved system and computer-implemented method for evaluating integrals using a quasi-Monte Carlo methodology that makes use of trajectory splitting by dependent sampling.

In brief summary, the invention provides a computer graphics system for generating a pixel value for a pixel in an image, the pixel value being representative of a point in a scene as recorded on an image plane of a simulated camera, the computer graphics system being configured to generate the pixel value for an image using a selected ray-tracing methodology in which simulated rays are shot from respective ones of a plurality of subpixels in the pixel, each subpixel having coordinates $(s_x, s_y)$ in the image plane The computer graphics system comprises a sample point generator and a function evaluator. The sample point generator is configured to map subpixel coordinates $(s_x, s_y)$ onto strata coordinates $(j,k) := (s_x \bmod 2^n, s_y \bmod 2^n)$, from which a ray is to be shot in accordance with $$x_i = \left( s_x + \frac{\sigma(k)}{2^n}, s_y + \frac{\sigma(j)}{2^n} \right)$$

where "i" is an instance number for the ray generated $i=j2^n + \sigma(k)$, where integer permutation $\sigma(k) := 2^n \Phi_b(k)$ for $0 \leq k < 2^n$ for selected "n," where $\Phi_b(x)$ is a radical inverse function given by $$\Phi_b : N_0 \to I$$

$$x = \sum_{j=0}^{\infty} a_j(x) b^j \mapsto \sum_{j=0}^{\infty} a_j(x) b^{-j-1}, \text{ where } (a_j)_{j=0}^{\infty}$$

is the representation of "x" in a selected integer base "b". The function evaluator is configured to generate at least one value representing an evaluation of a selected function using the strata coordinates generated by the sample point generator, the value generated by the function evaluator corresponding to the pixel value.

BRIEF DESCRIPTION OF THE DRAWINGS

This invention is pointed out with particularity in the appended claims. The above and further advantages of this invention may be better understood by referring to the following description taken in conjunction with the accompanying drawings, in which:

DETAILED DESCRIPTION OF AN ILLUSTRATIVE EMBODIMENT

The invention provides an computer graphic system and method for generating pixel values for pixels in an image of a scene, which makes use of a strictly-deterministic quasi-Monte Carlo methodology that makes use of trajectory splitting by dependent sampling for generating sample points for use in generating sample values for evaluating the integral or integrals whose function(s) represent the contributions of the light reflected from the various points in the scene to the respective pixel value, rather than the random or pseudo-random Monte Carlo methodology which has been used in the past. The strictly-deterministic methodology ensures a priori that the sample points will be generally more evenly distributed over the interval or region over which the integral(s) is (are) to be evaluated in a low-discrepancy manner.

Figure 1:
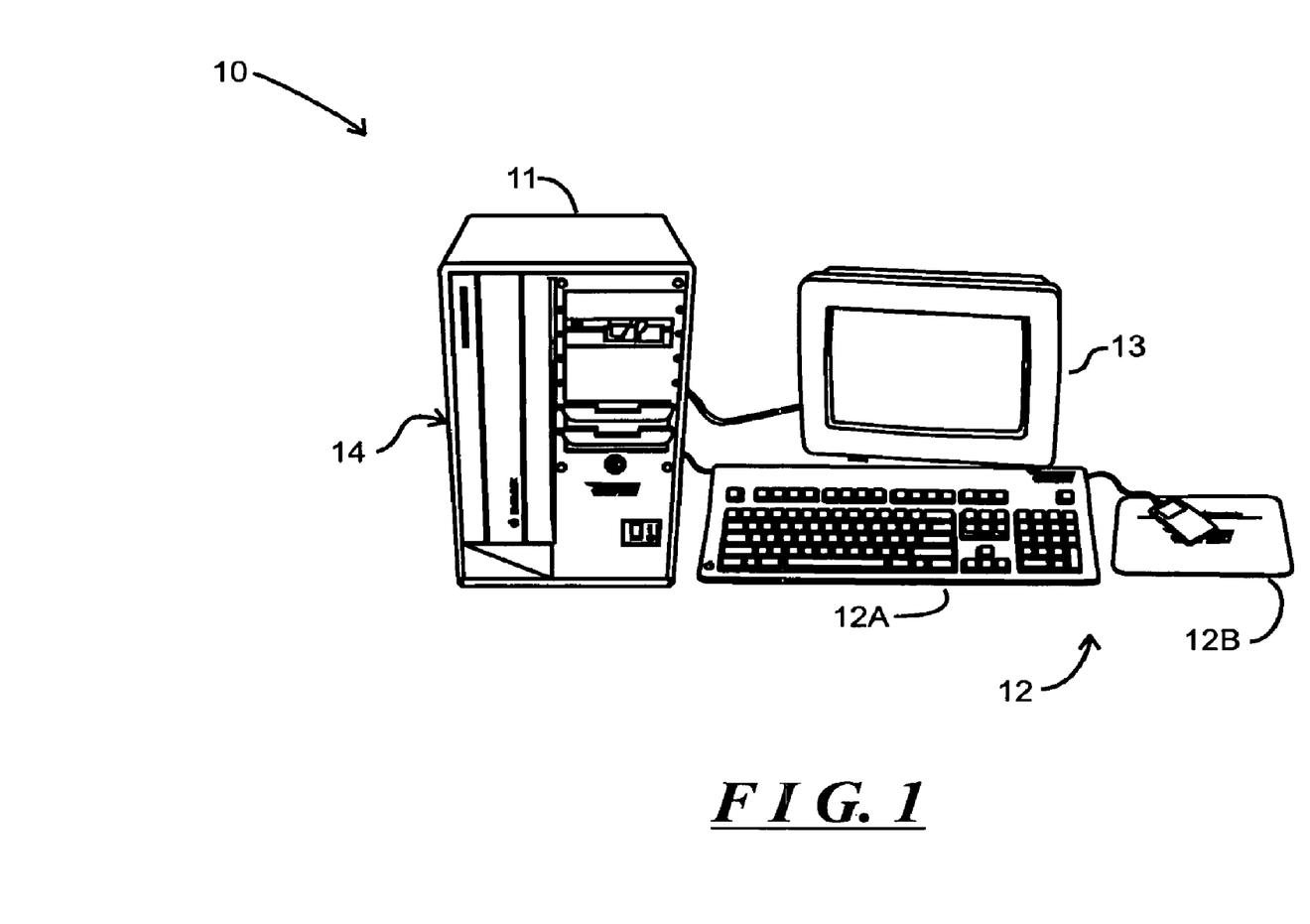
FIG. 1 depicts an illustrative computer graphics system that evaluates integrals using a quasi-Monte Carlo methodology that makes use of trajectory splitting by dependent sampling.

FIG. 1 attached hereto depicts an illustrative computer system 10 that makes use of such a strictly deterministic methodology. With reference to FIG. 1, the computer system 10 in one embodiment includes a processor module 11 and operator interface elements comprising operator input components such as a keyboard 12A and/or a mouse 12B (generally identified as operator input element(s) 12) and an operator output element such as a video display device 13. The illustrative computer system 10 is of the conventional stored-program computer architecture. The processor module 11 includes, for example, one or more processor, memory and mass storage devices, such as disk and/or tape storage elements (not separately shown), which perform processing and storage operations in connection with digital data provided thereto. The operator input element(s) 12 are provided to permit an operator to input information for processing. The video display device 13 is provided to display output information generated by the processor module 11 on a screen 14 to the operator, including data that the operator may input for processing, information that the operator may input to control processing, as well as information generated during processing. The processor module 11 generates information for display by the video display device 13 using a so-called "graphical user interface" ("GUI"), in which information for various applications programs is displayed using various "windows." Although the computer system 10 is shown as comprising particular components, such as the keyboard 12A and mouse 12B for receiving input information from an operator, and a video display device 13 for displaying output information to the operator, it will be appreciated that the computer system 10 may include a variety of components in addition to or instead of those depicted in FIG. 1.

In addition, the processor module 11 includes one or more network ports, generally identified by reference numeral 14, which are connected to communication links which connect the computer system 10 in a computer network. The network ports enable the computer system 10 to transmit information to, and receive information from, other computer systems and other devices in the network. In a typical network organized according to, for example, the client-server paradigm, certain computer systems in the network are designated as servers, which store data and programs (generally, "information") for processing by the other, client computer systems, thereby to enable the client computer systems to conveniently share the information. A client computer system which needs access to information maintained by a particular server will enable the server to download the information to it over the network. After processing the data, the client computer system may also return the processed data to the server for storage. In addition to computer systems (including the above-described servers and clients), a network may also include, for example, printers and facsimile devices, digital audio or video storage and distribution devices, and the like, which may be shared among the various computer systems connected in the network. The communication links interconnecting the computer systems in the network may, as is conventional, comprise any convenient information-carrying medium, including wires, optical fibers or other media for carrying signals among the computer systems. Computer systems transfer information over the network by means of messages transferred over the communication links, with each message including information and an identifier identifying the device to receive the message.

It will be helpful to initially provide some background on operations performed by the computer graphics system in generating an image. Generally, the computer graphic system generates an image that attempts to simulate an image of a scene that would be generated by a camera. The camera includes a shutter that will be open for a predetermined time T starting at a time $t_0$ to allow light from the scene to be directed to an image plane. The camera may also include a lens or lens model (generally, "lens") that serves to focus light from the scene onto the image plane. The average radiance flux $L_{m,n}$ through a pixel at position (m,n) on an image plane P, which represents the plane of the camera's recording medium, is determined by $$L_{m,n} = \frac{1}{|A_P| \cdot T \cdot |A_L|} \int_{A_P} \int_{t_0}^{t_0+T} \int_{A_L} L(h(x, t, y), \quad (7)$$
$$-\omega(x, t, y)) f_{m,n}(x, y, t) dy\, dt\, dx$$

where "$A_P$" refers to the area of the pixel, $A_L$ refers to the area of the portion of the lens through which rays of light pass from the scene to the pixel, and $f_{m,n}$ represents a filtering kernel associated with the pixel. An examination of the integral in equation (7) will reveal that, for the variables of integration, "x," "y" and "t," the variable "y" refers to integration over the lens area ($A_L$), the variable "t" refers to integration over time (the time interval from $t_0$ to $t_0+T$) and the variable "x" refers to integration over the pixel area ($A_P$).

The value of the integral in equation (7) is approximated in accordance with a quasi-Monte Carlo methodology by identifying $N_P$ sample points $x_i$ in the pixel area, and, for each sample point, shooting $N_T$ rays at times $t_{i,j}$ in the time interval $t_0$ to $t_0+T$ through the focus into the scene, with each ray spanning $N_L$ sample points $Y_{i,j,k}$ on the lens area $A_L$. The manner in which subpixel jitter positions $x_i$, points in time $t_{i,j}$ and positions on the lens $y_{i,j,k}$ are determined will be described below. These three parameters determine the primary ray hitting the scene geometry in $h(x_i,t_{i,j},y_{i,j,k})$ with the ray direction $\omega(x_i,t_{i,j},y_{i,j,k})$ In this manner, the value of the integral in equation (7) can be approximated as $$L_{m,n} \approx \frac{1}{N} \sum_{i=0}^{N_P-1} \frac{1}{N_T} \sum_{j=0}^{N_T-1} \frac{1}{N_L} \sum_{k=0}^{N_L-1} L(h(x_i, t_{i,j}, y_{i,j,k}), \quad (8)$$
$$-\omega(x_i, t_{i,j}, y_{i,j,k})) f_{m,n}(x_i, t_{i,j}, y_{i,j,k}),$$

where "N" is the total number of rays directed at the pixel.

It will be appreciated that rays directed from the scene toward the image plane can comprise rays directly from one or more light sources in the scene, as well as rays reflected off surfaces of objects in the scene. In addition, it will be appreciated that a ray that is reflected off a surface may have been directed to the surface directly from a light source, or a ray that was reflected off another surface. For a surface that reflects light rays, a reflection operator $T_{fr}$ is defined that includes a diffuse portion $T_{fd}$, a glossy portion $T_{fg}$ and a specular portion $T_{fs}$, or $$T_{fr} = R_{fd} + T_{fg} + T_{fs} \quad (9).$$

In that case, the Fredholm integral equation $L=L_e+T_{fr}L$ governing light transport can be represented as $$L=L_e+T_{fr-fs}L_e+T_{fs}(L-L_e)+T_{fs}L+T_{fd}T_{fg+fs}L+T_{fd}T_{fd}L \quad (10),$$

where transparency has been ignored for the sake of simplicity; transparency is treated in an analogous manner. The individual terms in equation (10) are (i) $L_e$ represents flux due to a light source;

(ii) $T_{fr-fs}L_e$ (where $T_{fr-fs}=T_{fr}-T_{fs}$) represents direct illumination, that is, flux reflected off a surface that was provided thereto directly by a light source; the specular component, associated with the specular portion $T_{fs}$ of the reflection operator, will be treated separately since it is modeled using a δ-distribution;

(iii) $T_{fg}(L-L_e)$ represents glossy illumination, which is handled by recursive distribution ray tracing, where, in the recursion, the source illumination has already been accounted for by the direct illumination (item (ii) above);

(iv) $T_{fs}L$ represents a specular component, which is handled by recursively using "L" for the reflected ray;

(v) $T_{fd}T_{fg+fs}L$ (where $T_{fg+fs}=T_{fg}+T_{fs}$) represents a caustic component, which is a ray that has been reflected off a glossy or specular surface (reference the $T_{fg+fs}$ operator) before hitting a diffuse surface (reference the $T_{fd}$ operator); this contribution can be approximated by a high resolution caustic photon map; and (vi) $T_{fd}T_{fd}L$ represents ambient light, which is very smooth and is therefore approximated using a low resolution global photon map.

As noted above, the value of the integral (equation (7)) is approximated by solving equation (8) making use of sample points $x_i$, $t_{i,j}$ and $y_{i,j,k}$, where "xi" refers to sample points within area $A_L$ of the respective pixel at location (m,n) in the image plane, "$t_{i,j}$" refers to sample points within the time interval $t_0$ to $t_0+T$ during which the shutter is open, and "$y_{i,j,k}$" refers to sample points on the lens $A_L$. In accordance with one aspect of the invention, the sample points $x_i$ comprise two-dimensional Hammersley points, which are defined as $$\left(\frac{i}{N}, \Phi_2(i)\right),$$

where $0 \leq i < N$, and $\Phi_2(i)$ refers to the radical inverse of "i" in base "two." Generally, the "s" dimensional Hammersley point set is defined as $$U_{N,s}^{Hammersley} : \{0, \ldots, N-1\} \to I^s \quad (11)$$

$$i \mapsto x_i := \left(\frac{i}{N}, \Phi_{b_1}(i), \ldots, \Phi_{b_{s-1}}(i)\right),$$

where $I^s$ is the s-dimensional unit cube $(0,1)^s$ (that is, an s-dimensional cube each of whose dimension includes "zero," and excludes "one"), the number of points "N" in the set is fixed and $b_1, \ldots, b_{s-1}$ are bases. The bases do not need to be prime numbers, but they are preferably relatively prime to provide a uniform distribution. The radical inverse function $\Phi_b$, in turn, is generally defined as $$\Phi_b : N_0 \to I \quad (12)$$

$$i = \sum_{j=0}^{\infty} a_j(i) b^j \mapsto \sum_{j=0}^{\infty} a_j(i) b^{-j-1}$$

where $(a_j)_{j=0}^{\infty}$ is the representation of "i" in integer base "b." At $N=(2^n)^2$, the two-dimensional Hammersley points are a $(0, 2n, 2)$-net in base "two," which are stratified on a $2^n$ by $2^n$ grid and a Latin hypercube sample at the same time, Considering the grid as subpixels, the complete subpixel grid underlying the image plane can be filled by simply abutting copies of the grid to each other.

Given integer subpixel coordinates $(s_x, s_y)$ the instance "i" and coordinates $(x,y)$ for the sample point $x_i$ in the image plane can be determined as follows. Preliminarily, examining $$\left(\frac{i}{N}, \Phi_2(i)\right)_{i=0}^{N-1},$$

one observes that
(a) each line in the stratified pattern is a shifted copy of another, and
(b) the pattern is symmetric to the line $y=x$, that is, each column is a shifted copy of another column.

Accordingly, given the integer permutation $\sigma(k) := 2^n \Phi_2(k)$ for $0 \leq k < 2^n$, subpixel coordinates $(s_x, s_y)$ are mapped onto strata coordinates $(j,k) := (s_x \bmod 2^n, s_y \bmod 2^n)$, an instance number "i" is computed as $$i = j2^n + \sigma(k) \quad (13)$$

and the positions of the jittered subpixel sample points are determined according to $$x_i = (s_x + \Phi_2(k), s_y + \Phi_2(j)) \quad (14)$$

$$= \left(s_x + \frac{\sigma(k)}{2^n}, s_y + \frac{\sigma(j)}{2^n}\right).$$

An efficient algorithm for generating the positions of the jittered subpixel sample points $x_i$ will be provided below in connection with Code Segment 1. A pattern of sample points whose positions are determined as described above in connection with equations (13) and (14) has an advantage of having much reduced discrepancy over a pattern determined using a Halton sequence or windowed Halton sequence, as described in the aforementioned Grabenstein application, and therefore the approximation described above in connection with equation (8) gives in general a better estimation to the value of the integral described above in connection with equation (7). In addition, if "N" is sufficiently large, sample points in adjacent pixels will have different patterns, reducing the likelihood that undesirable artifacts will be generated in the image.

A ray tree is a collection of paths of light rays that are traced from a point on the simulated camera's image plane into the scene. The computer graphics system 10 generates a ray tree by recursively following transmission, subsequent reflection and shadow rays using trajectory splitting. In accordance with another aspect of the invention, a path is determined by the components of one vector of a global generalized scrambled Hammersley point set. Generally, a scrambled Hammersley point set reduces or eliminates a problem that can arise in connection with higher-dimensioned low-discrepancy sequences since the radical inverse function (b typically has subsequences of b-1 equidistant values spaced by 1/b. Although these correlation patterns are merely noticeable in the full s-dimensional space, they are undesirable since they are prone to aliasing. The computer graphics system 10 attenuates this effect by scrambling, which corresponds to application of a permutation to the digits of the b-ary representation used in the radical inversion. For the symmetric permutation a from the symmetric group $S_b$ over integers $0, \ldots, b-1$, the scrambled radical inverse is defined as $$\Phi_b : N_0 \times S_b \to I \quad (15)$$

$$(i, \sigma) \mapsto \sum_{j=0}^{\infty} \sigma(a_j(i)) b^{-j-1} \Leftrightarrow i = \sum_{j=0}^{\infty} a_j(i) b^j.$$

If the symmetric permutation "a" is the identity, the scrambled radical inverse corresponds to the unscrambled radical inverse. In one embodiment, the computer graphics system generates the symmetric permutation ( recursively as follows. Starting from the permutation $\sigma_2 = (0,1)$ for base $b=2$, the sequence of permutations is defined as follows:

(i) if the base "b" is even, the permutation $\sigma_b$ is generated by first taking the values of $$2\sigma_{\frac{b}{2}}$$

and appending the values of $$2\sigma_{\frac{b}{2}} + 1,$$

and (ii) if the base "b" is odd, the permutation ab is generated by taking the values of $\sigma_{b-1}$, incrementing each value that is greater than or equal to $$\frac{b-1}{2}$$

by one, and inserting the value $$\frac{b-1}{2}$$

in the middle.

This recursive procedure results in
$\sigma_2=(0,1)$
$\sigma_3=(0,1,2)$
$\sigma_4=(0,2,1,3)$
$\sigma_5=(0,3,2,1,4)$
$\sigma_6=(0,2,4,1,3,5)$
$\sigma_7=(0,2,5,3,1,4,6)$
$\sigma_8=(0,4,2,6,1,5,3,7)\ldots$ The computer graphics system 10 can generate a generalized low-discrepancy point set as follows. It is often possible to obtain a low-discrepancy sequence by taking any rational s-dimensional point "x" as a starting point and determine a successor by applying the corresponding incremental radical inverse function to the components of "x." The result is referred to as the generalized low-discrepancy point set. This can be applied to both the Halton sequence and the Hammersley sequence. In the case of the generalized Halton sequence, this can be formalized as $$x_i = ((\Phi_{b_1}(i+i_1), \Phi_{b_2}(i+i_2), \ldots, \Phi(i+i_s)) \quad (16),$$

where the integer vector $(i_1, i_2, \ldots, i_s)$ represents the offsets per component and is fixed in advance for a generalized sequence. The integer vector can be determined by applying the inverse of the radical inversion to the starting point "x." A generalized Hammersley sequence can be generated in an analogous manner.

Returning to trajectory splitting, generally trajectory splitting is the evaluation of a local integral, which is of small dimension and which makes the actual integrand smoother, which improves overall convergence. Applying replication, positions of low-discrepancy sample points are determined that can be used in evaluating the local integral. The low-discrepancy sample points are shifted by the corresponding elements of the global scrambled Hammersley point set. Since trajectory splitting can occur multiple times on the same level in the ray tree, branches of the ray tree are decorrelated in order to avoid artifacts, the decorrelation being accomplished by generalizing the global scrambled Hammersley point set.

An efficient algorithm for generating a ray tree will be provided below in connection with Code Segment 2. Generally, in that algorithm, the instance number "i" of the low-discrepancy vector, as determined above in connection with equation (13), and the number "d" of used components, which corresponds to the current integral dimension, are added to the data structure that is maintained for the respective ray in the ray tree. The ray tree of a subpixel sample is completely specified by the instance number "i." After the dimension has been set to "two," which determines the component of the global Hammersley point set that is to be used next, the primary ray is cast into the scene to span its ray tree. In determining the deterministic splitting by the components of low discrepancy sample points, the computer graphics system 10 initially allocates the required number of dimensions "Δd." For example, in simulating glossy scattering, the required number of dimensions will correspond to "two." Thereafter, the computer graphics system 10 generates scattering directions from the offset given by the scrambled radical inverses $\Phi_{b_d}(i,\sigma_{b_d}), \ldots, \Phi_{b_{d+\Delta d-1}}(i,\sigma_{b_{d+\Delta d-1}})$, yielding the instances $$(y_{i,j})_{j=0}^{M-1} = \begin{pmatrix} \Phi_{b_d}(i, \sigma_{b_d}) \oplus \frac{j}{M}, \ldots, \Phi_{b_{d+\Delta d-1}} \\ (i, \sigma_{b_{d+\Delta d-1}}) \oplus \Phi_{b_{d+\Delta d-2}}(j, \sigma_{b_{d+\Delta d-2}}) \end{pmatrix}, \quad (17)$$

where $\oplus$ refers to addition modulo "one." Each direction of the "M" replicated rays is determined by $y_{i,j}$ and enters the next level of the ray tree with $d':=d+\Delta d$ as the new integral dimension in order to use the next elements of the low-discrepancy vector, and $i'=i+j$ in order to decorrelate subsequent trajectories. Using an infinite sequence of low-discrepancy sample points, the replication heuristic is turned into an adaptive consistent sampling arrangement. That is, computer graphics system 10 can fix the sampling rate ΔM, compare current and previous estimates every ΔM samples, and, if the estimates differ by less than a predetermined threshold value, terminate sampling. The computer graphics system 10 can, in turn, determine the threshold value, by importance information, that is, how much the local integral contributes to the global integral.

As noted above, the integral described above in connection with equation (7) is over a finite time period T from $t_0$ to $t_0+T$, during which time the shutter of the simulated camera is open. During the time period, if an object in the scene moves, the moving object may preferably be depicted in the image as blurred, with the extent of blurring being a function of the object's motion and the time interval $t_0+T$. Generally, motion during the time an image is recorded is linearly approximated by motion vectors, in which case the integrand (equation (7)) is relatively smooth over the time the shutter is open and is suited for correlated sampling. For a ray instance "i," started at the subpixel position $x_i$, the offset $\Phi_3(i)$ into the time interval is generated and the $N_T-1$ subsequent samples $$\Phi_3(i) + \frac{j}{N_T}$$

mod 1 are generated for $0<j<N_T$ that is $$t_{i,j} := t_0 + \left(\Phi_3(i) \oplus \frac{j}{N_T}\right) \cdot T. \quad (18)$$

It will be appreciated that the value of $N_T$ may be chosen to be "one," in which case there will be no subsequent samples for ray instance "i." Determining sample points in this manner fills the sampling space, resulting in a more rapid convergence to the value of the integral (equation (7)). For subsequent trajectory splitting, rays are decorrelated by setting the instance i'=i+j.

In addition to determining the position of the jittered subpixel sample point $x_i$, and adjusting the camera and scene according to the sample point t., for the time, the computer graphics system also simulates depth of field. In simulating depth of field, the camera to be simulated is assumed to be provided with a lens having known optical characteristics and, using geometrical optics, the subpixel sample point $x_i$ is mapped through the lens to yield a mapped point $x_i'$. The lens is sampled by mapping the dependent samples $$y_{i,j,k} = \left( \left( \Phi_5(i+j, \sigma_5) \oplus \frac{k}{N_L} \right), (\Phi_7(i+j, \sigma_7) \oplus \Phi_2(k)) \right) \quad (19)$$

onto the lens area $A_L$ using a suitable one of a plurality of known transformations. As with NT, the value of $N_L$ may be chosen to be "one." Thereafter, a ray is shot from the sample point on the lens specified by $y_{i,j,k}$ through the point $x_i'$ into the scene. The offset $(\Phi_5(i+j,\sigma_5), \Phi_7(i+j, \sigma_7))$ in equation (19) comprises the next components taken from the generalized scrambled Hammersley point set, which, for trajectory splitting, is displaced by the elements $$\left( \frac{k}{N_L}, \Phi_2(k) \right)$$

of the two-dimensional Hammersley point set. The instance of the ray originating from sample point $y_{i,j,k}$ is set to "i+j+k" in order to decorrelate further splitting down the ray tree. In equation (19), the scrambled samples $(\Phi_5(i+j,\sigma_5), \Phi_7((i+j, \sigma_7))$ are used instead of the unscrambled samples of $(\Phi_5(i+j), \Phi_7(i+j))$ since in bases "five" and "seven" up to five unscrambled samples will lie on a straight line, which will not be the case for the scrambled samples.

In connection with determination of a value for the direct illumination ($T_{f_r-f_s}L_e$ above), direct illumination is represented as an integral over the surface of the scene $\partial V$, which integral is decomposed into a sum of integrals, each over one of the "L" single area light sources in the scene. The individual integrals in turn are evaluated by dependent sampling, that is $$(T_{f_r-f_s}L_e)(y, z) = \int_{\partial V} L_e(x, y) f_r(x, y, z) G(x, y) dx \quad (20)$$

$$= \sum_{k=1}^{L} \int_{suppL_{e,k}} L_e(x, y) f_r(x, y, z) G(x, y) dx$$

$$\approx \sum_{k=1}^{L} \frac{1}{M_K} \sum_{j=0}^{M_k-1} L_e(x_j, y) f_r(x_j, y, z) G(x_j, y).$$

where $suppL_{e,k}$ refers to the surface of the respective "k-th" light source. In evaluating the estimate of the integral for the "k-th" light source, for the $M_k$-th query ray, shadow rays determine the fraction of visibility of the area light source, since the point visibility varies much more than the smooth shadow effect. For each light source, the emission $L_e$ is attenuated by a geometric term G, which includes the visibility, and the surface properties are given by a bidirectional distribution function $f_r$-$f_s$. These integrals are local integrals in the ray tree yielding the value of one node in the ray tree, and can be efficiently evaluated using dependent sampling. In dependent sampling, the query ray comes with the next free integral dimension "d" and the instance "i," from which the dependent samples are determined in accordance with $$x_j = \left( \Phi_{b_d}(i, \sigma_{b_d}) \oplus \frac{j}{M_k}, \Phi_{b_{d+1}}(i, \sigma_{b_{d+1}}) \oplus \Phi_2(j) \right). \quad (21)$$

The offset $(\Phi_{b_d}(i,\sigma_{b_d}), \Phi_{b_{d+1}}(i, \sigma_{b_{d+1}}))$ again is taken from the corresponding generalized scrambled Hammersley point set, which shifts the two-dimensional Hammersley point set $$\left( \frac{j}{M_k}, \Phi_2(j) \right)$$

on the light source. Selecting the sample rate $M_k=2^{m}$ as a power of two, the local minima is obtained for the discrepancy of the Hammersley point set that perfectly stratifies the light source. As an alternative, the light source can be sampled using an arbitrarily-chosen number $M_k$ of sample points using $$\left( \frac{j}{M_k}, \Phi_{M_k}(j, \sigma_{M_k}) \right)_{j=0}^{M_k-1}$$

as a replication rule. Due to the implicit stratification of the positions of the sample points as described above, the local convergence will be very smooth.

The glossy contribution $T_{f_s}(L-L_e)$ is determined in a manner similar to that described above in connection with area light sources (equations (20) and (21)), except that a model $f_g$ used to simulate glossy scattering will be used instead of the bidirectional distribution function $f_r$. In determining the glossy contribution, two-dimensional Hammersley points are generated for a fixed splitting rate M and shifted modulo "one" by the offset $(\Phi_{b_d}(i, \sigma_{b_d}), \Phi_{b_{d-1}}(i, \sigma_{b_{d-1}}))$ taken from the current ray tree depth given by the dimension field "d" of the incoming ray. The ray trees spanned into the scattering direction are decorrelated by assigning the instance fields i'=i+j in a manner similar to that done for simulation of motion blur and depth of field, as described above. The estimates generated for all rays are averaged by the splitting rate "M" and propagated up the ray tree.

Volumetric effects are typically provided by performing a line integration along respective rays from their origins to the nearest surface point in the scene. In providing for a volumetric effect, the computer graphics system 10 generates from the ray data a corresponding offset $\Phi_{b_d}(i)$ which it then uses to shift the M equidistant samples on the unit interval seen as a one-dimensional torus. In doing so, the rendering time is reduced in comparison to use of an uncorrelated jittering methodology. In addition, such equidistant shifted points typically obtain the best possible discrepancy in one dimension.

Global illumination includes a class of optical effects, such as indirect illumination, diffuse and glossy inter-reflections, caustics and color bleeding, that the computer graphics system 10 simulates in generating an image of objects in a scene. Simulation of global illumination typically involves the evaluation of a rendering equation. For the general form of an illustrative rendering equation useful in global illumination simulation, namely:

$$L(\vec{x},\vec{w}) = L_e(\vec{x},\vec{w}) + \int_{S'} f(\vec{x}, \vec{w}' \to \vec{w}) G(\vec{x},\vec{x}') V(\vec{x},\vec{x}') L(\vec{x},\vec{w}') dA' \quad (22)$$

it is recognized that the light radiated at a particular point $\vec{x}$ in a scene is generally the sum of two components, namely, the amount of light (if any) that is emitted from the point and the amount of light (if any) that originates from all other points and which is reflected or otherwise scattered from the point $\vec{x}$. In equation (22), $L(\vec{x},\vec{w})$ represents the radiance at the point $\vec{x}$ in the direction $\vec{w}=(\theta,\phi)$ (where "$\theta$" represents the angle of direction $\vec{w}$ relative to a direction orthogonal of the surface of the object in the scene containing the point $\vec{x}$, and "$\phi$" represents the angle of the component of direction $\vec{w}$ in a plane tangential to the point $\vec{x}$). Similarly, $L(\vec{x}',\vec{w}')$ in the integral represents the radiance at the point $\vec{x}'$ in the direction $\vec{w}'=(\theta',\phi')$ (where "$\theta'$" represents the angle of direction $\vec{w}'$ relative to a direction orthogonal of the surface of the object in the scene containing the point $\vec{x}'$, and "$\phi'$" represents the angle of the component of direction $\vec{w}'$ in a plane tangential to the point $\vec{x}'$), and represents the light, if any, that is emitted from point $\vec{x}'$ which may be reflected or otherwise scattered from point $\vec{x}$.

Continuing with equation (22), $L_e(\vec{x},\vec{w})$ represents the first component of the sum, namely, the radiance due to emission from the point $\vec{x}$ in the direction $\vec{w}$, and the integral over the sphere S' represents the second component, namely, the radiance due to scattering of light at point $\vec{x}$. $f(\vec{x},\vec{w}' \to \vec{w})$ is a bidirectional scattering distribution function which describes how much of the light coming from direction $\vec{w}'$ is reflected, refracted or otherwise scattered in the direction $\vec{w}$, and is generally the sum of a diffuse component, a glossy component and a specular component. In equation (22), the function $G(\vec{x},\vec{x}')$ is a geometric term $$G(\vec{x},\vec{x}') = \frac{\cos\theta\cos\theta'}{|\vec{x}-\vec{x}'|^2} \quad (23)$$

where $\theta$ and $\theta'$ are angles relative to the normals of the respective surfaces at points $\vec{x}$ and $\vec{x}'$, respectively. Further in equation (22), $V(\vec{x},\vec{x}')$ is a visibility function which equals the value one if the point $\vec{x}'$ is visible from the point x and zero if the point $\vec{x}'$ is not visible from the point $\vec{x}$.

The computer graphics system 10 makes use of global illumination specifically in connection with determination of the diffuse component $T_{fd}T_{fd}L$ and the caustic component $T_{fd}T_{fg+fs}L$ using a photon map technique. Generally, a photon map is constructed by simulating the emission of photons by light source(s) in the scene and tracing the path of each of the photons. For each simulated photon that strikes a surface of an object in the scene, information concerning the simulated photon is stored in a data structure referred to as a photon map, including, for example, the simulated photon's color, position and direction angle. Thereafter a Russian roulette operation is performed to determine the photon's state, that is, whether the simulated photon will be deemed to have been absorbed or reflected by the surface. If a simulated photon is deemed to have been reflected by the surface, the simulated photon's direction is determined using, for example, a bidirectional reflectance distribution function ("BRDF"). If the reflected simulated photon strikes another surface, these operations will be repeated (reference the aforementioned Grabenstein application). The data structure in which information for the various simulated photons is stored may have any convenient form; typically k-dimensional trees, for "k" an integer, are used. After the photon map has been generated, it can be used in rendering the respective components of the image.

In generating a photon map, the computer graphics system 10 simulates photon trajectories, thus avoiding the necessity of discretizing the kernel of the underlying integral equation. The interactions of the photons with the scene, as described above, are stored and used for density estimation. The computer graphics system 10 makes use of a scrambled low-discrepancy strictly of the deterministic sequence, such as a scrambled Halton sequence, which has better discrepancy properties in higher dimensions than does an unscrambled sequence. The scrambled sequence also has the benefit, over a random sequence, that the approximation error decreases more smoothly, which will allow for use of an adaptive termination scheme during generation of the estimate of the integral. In addition, since the scrambled sequence is strictly deterministic, generation of estimates can readily be parallelized by assigning certain segments of the low-discrepancy sequence to ones of a plurality of processors, which can operate on portions of the computation independently and in parallel. Since usually the space in which photons will be shot by selecting directions will be much larger than the area of the light sources from which the photons were initially shot, it is advantageous to make use of components of smaller discrepancy, for example, $\Phi_2$ or $\Phi_3$ (where, as above, $\Phi_b$ refers to the radical inverse function for base "b"), for use in connection with angles at which photons are shot, and components of higher discrepancy, for example, scrambled $\Phi_5$ or $\Phi_7$, for use in connection with sampling of the area of the respective light source, which will facilitate filling the space more uniformly.

The computer graphics system 10 estimates the radiance from the photons in accordance with $$\bar{L}_r(x,\omega) \approx \frac{1}{A} \sum_{i \in B_k(x)} f_r(\omega_i, x, \omega) \Phi_i \quad (24)$$

where, in equation (24), $\Phi_i$ represents the energy of the respective "i-th" photon, $\omega_i$ is the direction of incidence of the "i-th photon, "$B_k(x)$" represents the set of the "k" nearest photons around the point "x," and "A" represents an area around point "x" that includes the photons in the set $B_k(x)$. Since the energy of a photon is a function of its wavelength, the $\Phi_i$ in equation (24) also represents the color of the respective "i-th" photon. The computer graphics system 10 makes use of an unbiased but consistent estimator for the area "A" for use in equation (24), which is determined as follows. Given a query ball, that is, a sphere that is centered at point "x" and whose radius $r(B_k(x))$ is the minimal radius necessary for the sphere to include the entire set $B_k(x)$, a tangential disk D of radius $r(B_k(x))$ centered on the point "x" is divided into M equal-sized subdomains $D_i$, that is $$\bigcup_{i=0}^{M-1} D_i = D \text{ and } D_i \cap D_j \neq 0 \text{ for } i \neq j, \text{ where} \quad (25)$$

$$|D_i| = \frac{|D|}{M} = \frac{\pi r^2(B_k(x))}{M}.$$

The set $$P = \{D_i \mid D_i \cap \{x_i|_D \mid i \in B_k(x)\} \neq 0\} \quad (26)$$

contains all the subdomains $D_i$ that contain a point $x_i|D$ on the disk, which is the position of the "i-th" photon projected onto the plane defined by the disk D along its direction of incidence $\omega_i$. Preferably, the number M of subdomains will be on the order of $\sqrt{k}$ and the angular subdivision will be finer than the radial subdivision in order to capture geometry borders. The actual area A is then determined by $$A = \pi r^2(B_k(x)) \frac{|P|}{M}. \quad (27)$$

Determining the actual coverage of the disk D by photons significantly improves the radiance estimate (equation (24)) in corners and on borders, where the area obtained by the standard estimate $\pi r^2(B_k(x))$ would be too small, which would be the case at corners, or too large, which would be the case at borders. In order to avoid blurring of sharp contours of caustics and shadows, the computer graphics system 10 sets the radiance estimate L to black if all domains $D_i$ that touch point "x" do not contain any photons.

It will be appreciated that, in regions of high photon density, the "k" nearest photons may lead to a radius $r(B_k(x))$ that is nearly zero, which can cause an over-modulation of the estimate. Over-modulation can be avoided by selecting a minimum radius $r_{min}$, which will be used if $r(B_k(x))$ is less than $r_{min}$. In that case, instead of equation (24), the estimate is generated in accordance with $$\bar{L}_r(x, \omega) = \frac{N}{k} \sum_{i \in B_k(x)} \Phi_i f_r(\omega_i, x, \omega_r) \quad (28)$$

assuming each photon is started with 1/N of the total flux $\Phi$. The estimator in equation (28) provides an estimate for the mean flux of the "k" photons if $r(B_k(x)) < r_{min}$.

The global photon map is generally rather coarse and, as a result, subpixel samples can result in identical photon map queries. As a result, the direct visualization of the global photon map is blurry and it is advantageous to perform a smoothing operation in connection therewith In performing such an operation, the computer graphics system 10 performs a local pass integration that removes artifacts of the direct visualization. Accordingly, the computer graphics system 10 generates an approximation for the diffuse illumination term $T_{fd}T_{fd}L$ as $$T_{fd}T_{fd}L \approx (T_{fd}\bar{L}_r)(x) \quad (29)$$

$$= \int_{S^2(x)} f_d(x)\bar{L}_r(h(x, \vec{\omega}))\cos\theta d\omega$$

$$\approx \frac{f_d(x)}{M} \sum_{i=0}^{M-1} \bar{L}_r(h(x, \omega(\arcsin\sqrt{u_{i,1}}, 2\pi u_{i,2}))),$$

with the integral over the hemisphere $S^2(X)$ of incident directions aligned by the surface normal in "x" being evaluated using importance sampling. The computer graphics system 10 stratifies the sample points on a two-dimensional grid by applying dependent trajectory splitting with the Hammersley sequence and thereafter applies irradiance interpolation. Instead of storing the incident flux $\Phi_i$ of the respective photons, the computer graphics system 10 stores their reflected diffuse power $f_d(x_i)\Phi_i$ with the respective photons in the photon map, which allows for a more exact approximation than can be obtained by only sampling the diffuse BRDF in the hit points of the final gather rays. In addition, the BRDF evaluation is needed only once per photon, saving the evaluations during the final gathering. Instead of sampling the full grid, the computer graphics system 10 uses adaptive sampling, in which refinement is triggered by contrast, distance traveled by the final gather rays in order to more evenly sample the projected solid angle, and the number of photons that are incident form the portion of the projected hemisphere. The computer graphics system fills in positions in the grid that are not sampled by interpolation. The resulting image matrix of the projected hemisphere is median filtered in order to remove weak singularities, after which the approximation is generated. The computer graphics system 10 performs the same operation in connection with, for example, hemispherical sky illumination, spherical high dynamic-range environmental maps, or any other environmental light source.

The computer graphics system 10 processes final gather rays that strike objects that do not cause caustics, such as plane glass windows, by recursive ray tracing. If the hit point of a final gather ray is closer to its origin than a predetermined threshold, the computer graphics system 10 also performs recursive ray tracing. This reduces the likelihood that blurry artifacts will appear in corners, which might otherwise occur since for close hit points the same photons would be collected, which can indirectly expose the blurry structure of the global photon map.

Generally, photon maps have been taken as a snapshot at one point in time, and thus were unsuitable in connection with rendering of motion blur. Following the observation that averaging the result of a plurality of photon maps is generally similar to querying one photon map with the total number of photons from all of the plurality of photon maps, the computer graphics system 10 generates $N_T$ photon maps, where $N_T$ is determined as described above, at points in time $$t_b = t_0 + \frac{b + \frac{1}{2}}{N_T}T, \quad (30)$$

for $0 \leq b < NT$. As noted above, $N_T$ can equal "one," in which case "N" photon maps are used, with "N" being chosen as described above. In that case, $$t_i = t_0 + \Phi_3(i)T \quad (31),$$

and thus $t_{i,j}=t_{i,o}$, that is, "$t_i$," for $N_T=1$, In the general case (equation (30)), during rendering, the computer graphics system 10 uses the photon map with the smallest time difference $|t_{i,j}-t_b|$ in connection with rendering for the time sample point $t_{i,j}$.

The invention provides a number of advantages. In particular, the invention provides a computer graphics system that makes use of strictly deterministic distributed ray tracing based on low-discrepancy sampling and dependent trajectory splitting in connection with rendering of an image of a scene. Generally, strictly deterministic distributed ray tracing based on deterministic low of the discrepancy sampling and dependent trajectory splitting is simpler to implement than an implementation based on random or pseudo-random numbers. Due to the properties of the radical inverse function, stratification of sample points is intrinsic and does not need to be considered independently of the generation of the positions of the sample points. In addition, since the methodology is strictly deterministic, it can be readily parallelized by dividing the image into a plurality of tasks, which can be executed by a plurality of processors in parallel. There is no need to take a step of ensuring that positions of sample points are not correlated, which is generally necessary if a methodology based on random or pseudo-random numbers is to be implemented for processing in parallel.

Moreover, the methodology can be readily implemented in hardware, such as a graphics accelerator, particularly if Hammersley point sets are used, since all points with a fixed index "i" yield a regular grid. A graphics accelerator can render a plurality of partial images corresponding to these regular grids in a number of parallel tasks, and interleave the partial images in an accumulation buffer to provide the final image. Operating in this manner provides very good load balancing among the parallel tasks, since all of the tasks render almost the same image.

In addition, the methodology can readily be extended to facilitate rendering of animations. Generally, an animation consists of a series of frames, each frame comprising an image. In order to decorrelate the various frames, instead of initializing the field of integers used as identifiers for ray instances for each frame by "i," "i+$i_f$" can be used, where "$i_f$" is a frame number. This operates as an offsetting of "i" by "$i_f$," which is simply a generalization of the Hammersley points. A user can select to initialize the field of integers for each frame by "i," in which case the frames will not be correlated. In that case, undersampling artifacts caused by smooth motion will remain local and are only smoothly varying. Alternatively, the user can select to initialize the field of integers for each frame by "i+$i_f$," in which case the artifacts will not remain local, and will instead appear as noise or film grain flicker in the final animation. The latter is sometimes a desired feature of the resulting animation, whether for artistic reasons or to match actual film grain. Another variation is to add $i_f$ directly to k and clip the result by $2^n$ (reference Code Segment 1, below). In that case, the pixel sampling pattern will change from frame to frame and the frame number $i_f$ will need to be known in the post-production process in order to reconstruct the pixel sampling pattern for compositing purposes.

Generally, a computer graphics system that makes use of deterministic low-discrepancy sampling in determination of sample points will perform better than a computer graphics system that makes use of random or pseudo-random sampling, but the performance may degrade to that of a system that makes use of random or pseudo-random sampling in higher dimensions. By providing that the computer graphics system performs dependent splitting by replication, the superior convergence of low-dimensional low-discrepancy sampling can be exploited with the effect that the overall integrand becomes smoother, resulting in better convergence than with stratified random or pseudo-random sampling. Since the computer graphics system also makes use of dependent trajectory sampling by means of infinite low discrepancy sequences, consistent adaptive sampling of, for example, light sources, can also be performed.

In addition, it will be appreciated that, although the computer graphics system has been described as making use of sample points generated using generalized scrambled and/or unscrambled Hammersley and Halton sequences, it will be appreciated that generally any (t,m,s)-net or (t,s)-sequence can be used.

At a more general level, the invention provides an improved quasi-Monte Carlo methodology for evaluating an integral of a function f on the "s" dimensional unit cube $[0,1)^s$. In contrast with this methodology, which will be referred to as trajectory splitting by dependent splitting, in prior methodologies, the sample points in the integration domain for which the sample values at which sample values for the function were generated were determined by providing the same number of coordinate samples along each dimension. However, for some dimensions of an integrand, it is often the case that the function f will exhibit a higher variance than for other dimensions. The invention exploits this by making use of trajectory splitting by dependent samples in critical regions.

For example, assume that a function f is to be integrated over $s=s_1+s_2$ dimensions. The partial integral (equation (32))

$$g(x) = \int_{I^{s_2}} f(x,y) dy \approx \frac{1}{N^2} \sum_{j=0}^{N_2-1} f(x, y_j) \quad (32)$$

(x" and "y" comprising disjoint sets of the "s" dimensions, and x∪y comprising the set of all of the dimensions), where "$N_2$" identifies the number of samples selected for the set "y" of dimensions, can be defined over the portion of the integration domain that is defined by unit cube $[0,1)^{s_2}$, which, in turn, corresponds to the portion of the integration domain that is associated with set $s_2$ dimensions. Evaluating g(x) using equation (32) will affect a smoothing of the function f in the $s_2$ dimensions that are associated with set "y."

The result generated by applying equation (32) can then be used to evaluate the full integral $$\int_{I^{s_1}} \int_{I^{s_2}} f(x,y) dy dx = \int_{I^{s_1}} g(x) dx \quad (33)$$

$$\approx \frac{1}{N_1} \sum_{i=0}^{N_1-1} \frac{1}{N_2} \sum_{j=0}^{N_2-1} f(x_i, y_j),$$

where "$N_1$" identifies the number of samples selected for the set "x" of dimensions, that is, over the remaining dimensions of the integration domain that are associated with the s, dimensions that are associated with the set "x." If the dimension splitting x, y is selected such that the function f exhibits relatively high variance over the set "y" of the integration domain, and relatively low variance over the set "x," it will not be necessary to generate sample values for the function $N_1$-times-$N_2$ times. In that case, it will suffice to generate sample only values $N_2$ times over the integration domain. If the correlation coefficient of f(ζ, η) and f(∂,η'), which indicates the degree of correlation between values of function evaluated, for the former, at $(x_i,y_i)=(\zeta,\eta)$, and, for the later, at $(x_i,y_i)=(\zeta,\eta')$, is relatively high, the time complexity required to evaluate the function $f_{[0,1)^s}(x_0,\ldots,x_{s-1})$ will be decreased.

The smoothness of an integrand can be exploited using a methodology that will be referred to as correlated sampling. Generally, that is, if correlated sampling is not used, in evaluating an integral, each dimension will be associated with its respective sequence. However, in correlated sampling, the same sequence can be used for all of the dimensions over the integration domain, that is $$\frac{1}{M}\sum_{j=1}^{N}\frac{1}{N_j}\sum_{i=0}^{N_j-1}f_j(x_i,y_j) \approx \frac{1}{M}\sum_{j=1}^{M}\int_{I^s}f_j(x)dx \quad (34)$$

$$= \int_{I^s}\frac{1}{M}\sum_{j=1}^{M}f_j(x)dx$$

$$\approx \frac{1}{N}\sum_{i=0}^{N-1}\frac{1}{M}\sum_{j=1}^{M}f_j(x_i)$$

The methodology of trajectory splitting by depending sampling makes use of a combination of the trajectory splitting technique described above in connection with equations (32) and (33) with the correlated sampling methodology described in connection with equation (34).

Since integrals are invariant under toroidal shifting for $z_j \in I^{s2}$, that is, $$S_j:I^{s2} \to I^{s2} \Rightarrow \int_{I^{s2}}g(y)dy = \int_{I^{s2}}g(S_j(y))dy, \quad (35)$$
$$y \mapsto (y+z_j)\bmod 1$$

the values of the integrals also do not change. Thus, if, in equation (33), the inner integral is replicated "M" times, $$\int_{I^{s1}}\int_{I^{s2}}f(x,y)dydx = \int_{I^{s1}}\int_{I^{s2}}\frac{1}{M}\sum_{j=0}^{M-1}f(x,S_j(y))dydx \quad (36)$$

$$\approx \frac{1}{N}\sum_{i=0}^{N-1}\frac{1}{M}\sum_{j=0}^{M-1}f(x_i,S_j(y_i))$$

$$= \frac{1}{N}\sum_{i=0}^{N-1}\frac{1}{M}\sum_{j=0}^{M-1}f(x_i,(y_i+z_j)\bmod 1).$$

For index "j," the functions $f(x_i, S_j(y_i))$ are correlated, enabling the smoothness of the integrand in those dimensions that are represented by "y" to be exploited, as illustrated above in connection with equation (19) (lens sampling), equations (20) and (21) (area light sources) and equation (29) (approximation for the diffuse illumination term). It will be appreciated that the evaluation using the replication is the repeated application of the local quadrature rule $U_{M,s2}:=(z_j)_{j=0}^{M}$ shifted by random offset values $y_i$. The use of dependent variables in this manner pays off particularly if there is some smoothness in the integrand along one or more dimensions. Splitting can be applied recursively, which yields a history tree, in which each path through the respective history tree represents a trajectory of a particle such as a photon.

The quasi-Monte Carlo methodology of trajectory splitting by dependent sampling makes use of sets of deterministic, low-discrepancy sample points both for the global quadrature rule $U_{N,S_1+S_2}=(x_i,y_i)_{i=0}^{N}$, that is, integration over all of the dimensions $S_1+S_2$ comprising the entire integration domain, as well as for the local quadrature rule $U_{M,s_2}:=(z_j)_{j=0}^{M}$, that is, integration over the dimensions S2 of the integration domain. The methodology unites splitting and dependent sampling, exploiting the stratification properties of low-discrepancy sampling. Accordingly, it will be possible to concentrate more samples along those dimensions in which the integrand exhibits high levels of variation, and fewer samples along those dimensions in which the integrand exhibits low levels of variation, which reduces the number of sample points at which the function will need to be evaluated. If the methodology is to be applied recursively a plurality of times, it will generally be worthwhile to calculate a series of values $z_j$ that are to comprise the set $U_{M,S2}$. In addition, the methodology may be used along with importance sampling and, if U is an infinite sequence, adaptive sampling. In connection with adaptive sampling, the adaptations will be applied in the replication independently of the sampling rate, so that the algorithm will remain consistent. The low-discrepancy sample points sets $U_{N,s1+s2}$ and $U_{M,s2}$ can be chosen arbitrarily; for example, the sample point set $U_{M,s5}$ can be a projection of sample point set $U_{N,s1+s2}$. When trajectory splitting is recursively applied to build trajectory trees, generalizing the point set $U_{N,s1+s2}$ for the subsequent branches can be used to decorrelate the separate parts of the respective tree.

Code Segment 1

The following is a code fragment in the C++ programming language for generating the positions of the jittered subpixel sample points $x_i$

```
unsigned short Period, *Sigma;
void InitSigma(int n)
{
    unsigned short Inverse, Digit, Bits;
    Period = 1 << n;
    Sigma = new unsigned short [Period];
    for (unsigned short i = 0; i < Period; i++)
    {
        Digit = Period
        Inverse = 0;
        for (bits = i; bits; bits >>= 1)
        {
            Digit >>= 1;
            if (Bits & 1)
                inverse += Digit;
        }
        Sigma[i] = Inverse;
    }
}
void SampleSubpixel(unsigned int *i, double *x, double *y, int s_x,
    int s_y)
{
    int j = s_x & (Period - 1);
    int k = s_y & (Period - 1);
    *i = j * Period + Sigma[k]
    *x = (double) s_x + (double) Sigma[k]/(double) Period;
    *y = (double) s_y + (double) Sigma[j]/(double) Period;
}
```

Code Segment 2

The following is a code fragment in the C++ programming language for generating a ray tree

```
class Ray
{
    int i; //current instance of low discrepency vector
    int d; //current integral dimension in ray tree
    ...
}
void Shade (Ray& Ray)
{
    Ray next_ray;
    int i = ray.i;
    int d = ray.d
    ...
    for (int j = 0; j < M; j++)
    {
        ...
        // ray set up for recursion
```

$$y = \left(\Phi_{b_d}(i, \sigma_{b_d}) \oplus \frac{j}{M}, ..., (\Phi_{b_{d+\Delta d-1}}) \oplus \Phi_{b_{d+\Delta d-2}}(i, \sigma_{b_{d+\Delta d-2}})\right)$$

```
        next_ray = SetUpRay(y); // determine ray parameters by y
        next_ray.i = i + j; // decorrelation by generalization
        next_ray.d = d + Δd; //dimension allocation
        Shade(next_ray);
        ...
    }
}
```

Figure 2:
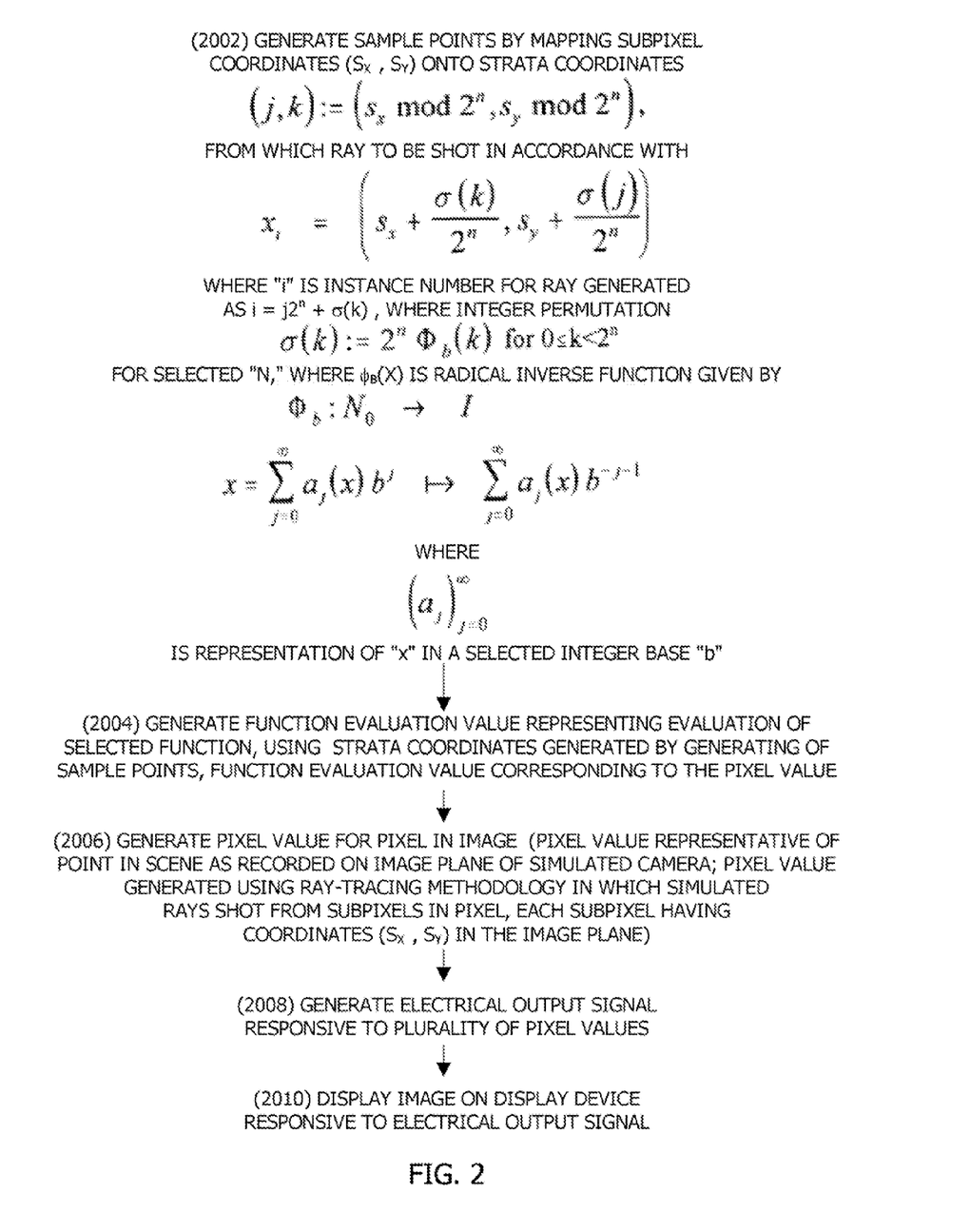
FIG. 2 is a flowchart of a method in accordance with the invention.

It will be appreciated that a system in accordance with the invention can be constructed in whole or in part from special purpose hardware or a general purpose computer system, or any combination thereof, any portion of which may be controlled by a suitable program. Any program may in whole or in part comprise part of or be stored on the system in a conventional manner, or it may in whole or in part be provided in to the system over a network or other mechanism for transferring information in a conventional manner. In addition, it will be appreciated that the system may be operated and/or otherwise controlled by means of information provided by an operator using operator input elements (not shown) which may be connected directly to the system or which may transfer the information to the system over a network or other mechanism for transferring information in a conventional manner. Aspects of a method in accordance with the invention are depicted in the flowchart of FIG. 2, including generating sample points bx mapping subpixel coordinates onto strata coordinates from which a ray is to be shot in accordance with the noted mathematical functions (2002 of FIG. 2); generating a function evaluation value representing an evaluation of a selected function, using the strata coordinates generated by the generating of the sample points. wherein the function evaluation value corresponds to the pixel value (2004 of FIG. 2) generating a pixel value for a pixel, using a ray-tracing methodology in which simulated rays are shot from subpixels in the pixel, each subpixel having the noted coordinates in the image plane (2006); generating an electrical output signal responsive to a plurality of the pixel values (2008); and displaying an image on a dsplay device responsive to the electrical output signal (2010).

The foregoing description has been limited to a specific embodiment of this invention. It will be apparent, however, that various variations and modifications may be made to the invention, with the attainment of some or all of the advantages of the invention. It is the object of the appended claims to cover these and such other variations and modifications as come within the true spirit and scope of the invention.

I claim:

1. In a computer graphics system comprising a computer operable to (1) generate a pixel value for a pixel in an image, (2) generate an electrical output signal responsive to a plurality of pixel values, and (3) display the image on a display device in response to the electrical output signal, wherein the pixel value is representative of a point in a scene as recorded on an image plane of a simulated camera, the computer being configured to generate the pixel value for an image using a selected ray-tracing methodology in which simulated rays are shot from respective ones of a plurality of subpixels in the pixel, each subpixel having coordinated ($s_s$, $s_y$) in the image plane, the improvement comprising:

A. a sample point generator, in the computer, configured to map subpixel coordinates ($s_s$,$s_y$) onto strata coordinates $$(j,k) := (s_x \bmod 2^n, s_y \bmod 2^n),$$

from which a ray is to be shot in accordance with $$x_i = \left(s_x + \frac{\sigma(k)}{2^n}, s_y + \frac{\sigma(j)}{2^n}\right),$$

where "i" is an instance number for the ray generated as $i = j2^n + \sigma(k)$, were integer permutation $$\sigma(k) := 2^n \Phi_b(k) \text{ for } 0 \leq k < 2^n$$

for selected "n," where $\phi_b(x)$ is a radical inverse function given by $$\Phi_b : N_0 \to I$$
$$x = \sum_{j=0}^{\infty} a_j(x) b^j \mapsto \sum_{j=0}^{\infty} a_j(x) b^{-j-1}, \text{ where } (a_j)_{j=0}^{\infty},$$

is the representation of "x" in a selected integer base "b"; and

B. a function evaluator in the computer, in communication with the sample point generator, configured to generate at least one value representing an evaluation of a selected function using the strata coordinates generated by the sample point generator, the value generated by the function evaluator corresponding to the pixel value, so as to enable the generation of the pixel value, the electrical output signal and the display of the image.

2. In a computer graphics system comprising a computer operable to (1) generate a pixel value for a pixel in an image, (2) generate an electrical output signal responsive to a plurality of pixel values, and (3) display the image on a display device in response to the electrical output signal, wherein the pixel value is representative of a point in a scene as recorded on an image plane of a simulated camera, the computer being configured to generate the pixel value for an image using a selected ray-tracing methodology in which simulated rays are shot from respective ones of a plurality of subpixels in the pixel, each subpixel having coordinates ($s_x$, $s_y$) in the image plane, the method comprising:

A. generating, in the computer, sample points by mapping subpixel coordinates ($s_x$, $s_y$) onto strata coordinates $$(j,k) := (s_x \text{ med } 2^n, s_y \text{ mod } 2^n),$$

from which a ray is to be shot in accordance with $$x_i = \left(s_x + \frac{\sigma(k)}{2^n}, s_y + \frac{\sigma(j)}{2^n}\right),$$

where "i" is an instance number for the ray generated as $i = j2^n + \sigma(k)$, where integer permutation $$\sigma(k) := 2^n \Phi_b(k) \text{ for } 0 \leq k < 2^n$$

for selected "n," where $\phi_b(x)$ is a radical inverse function given by $$\Phi_b : N_0 \to I$$

-continued $$x = \sum_{j=0}^{\infty} a_j(x) b^j \mapsto \sum_{j=0}^{\infty} a_j(x) b^{-j-1}$$

where $$(a_j)_{j=0}^{\infty},$$

is the representation of "x" in a selected integer base "b", and

B. generating in the computer, at least one function evaluation value, representing an evaluation of a selected function, using the strata coordinates generated by the generating of sample points, the function evaluation value corresponding to the pixel value, so as to enable the generation of the pixel value, the electrical output signal and the display of the image.

\* \* \* \* \*